(12) United States Patent
Grunwald

(10) Patent No.: US 6,217,517 B1
(45) Date of Patent: Apr. 17, 2001

(54) ULTRASOUND IMAGING WITH ZOOM HAVING INDEPENDENT PROCESSING CHANNELS

(75) Inventor: Sorin Grunwald, Santa Clara, CA (US)

(73) Assignees: Scimed Life Systems, Inc., Maple Grove, MN (US); Boston Scientific Limited, St. Michael (BB)

( * ) Notice: Subject to any disclaimer, the term of this patent is extended or adjusted under 35 U.S.C. 154(b) by 0 days.

(21) Appl. No.: 09/499,270

(22) Filed: Feb. 7, 2000

Related U.S. Application Data

(63) Continuation of application No. 09/162,057, filed on Sep. 28, 1998, now Pat. No. 6,063,032.

(51) Int. Cl.$^7$ .................................................. A61B 8/00
(52) U.S. Cl. ............................................................ 600/440
(58) Field of Search ................................... 600/437, 440, 600/441, 443, 447; 382/128, 131–132, 298–300, 276, 284

(56) References Cited

U.S. PATENT DOCUMENTS 5,483,963  1/1996  Butler et al. .

6,063,032  * 5/2000  Grunwald ............................ 600/440

FOREIGN PATENT DOCUMENTS 2 089 537  6/1982  (GB) .
2 304 251  3/1997  (GB) .

OTHER PUBLICATIONS

EPO Publication No. 0 520 397 A2, M. Shen et al, "Ultrasound Imaging System and Method", Dec. 20, 1992.
EPO Publication No. EP 0 859 242 A1, R.E. Daigle, et al., "High Resolution Ultrasonic Imaging Through Interpolation of Received Scanline Date", Feb. 13, 1997.

\* cited by examiner

Primary Examiner—Francis J. Jaworski
(74) Attorney, Agent, or Firm—Lyon & Lyon LLP

(57) ABSTRACT

A system and method for simultaneously displaying an ultrasound image of an area of interest and a magnified portion of the image are disclosed. Pixel locations on the display device are translated to locations within the area of interest. Signals corresponding to locations adjacent to the translated location are acquired and multiplied with coefficients. The coefficients may be varied in real time to address, for example, context dependence. The multiplied signals are summed to form an interpolated signal corresponding to a given pixel.

15 Claims, 3 Drawing Sheets

ULTRASOUND IMAGING WITH ZOOM HAVING INDEPENDENT PROCESSING CHANNELS

This application is a continuation of Ser. No. 09/162,057, filed Sep. 28, 1996, now U.S. Pat. No. 6,063,032.

INTRODUCTION

This invention relates to diagnostic imaging, and more particularly relates to scan conversion systems and methods used to display enlarged portions of a diagnostic image such as an ultrasonic image.

BACKGROUND OF THE INVENTION

Diagnostic imaging systems are conventionally used in numerous medical procedures. These systems often require scan conversion techniques. For example, intravascular ultrasound systems scan within an area of interest in a vessel using a rapidly rotating catheter-mounted transducer transmitting ultrasound pulses and receiving returned echo signals. The detected ultrasound echo signals correspond to a particular R, θ location in the area of interest. For example, at a particular θ, echo signals are received corresponding to a radial distance R1, R2, etc., forming what is conventionally known as a vector of data signals. Other vectors at varying values of θ are collected to complete a scan of the area of interest. Although the data is collected according to R, θ locations, CRT displays using conventional raster scans display pixels according to Cartesian or X, Y locations. Each screen pixel display element has an X, Y coordinate position within a raster scan. This X, Y coordinate position must be mapped back to a correlated location in the area of interest in order to assign a screen pixel display level, thus forming an image on the display. The correlated location in the area of interest will not ordinarily correspond to the R, θ location of collected data. Accordingly, the screen pixel display level is generated by interpolating the signals corresponding to echoes from R, θ locations adjacent to the correlated location. The mapping and interpolation of data from R, θ to X, Y coordinates prior to CRT display is known as scan conversion.

Scan conversion and display of diagnostic images is complicated by the desires of clinicians who, in real time, want to: a) image as much of the area of interest as possible, but also b) display as much detail as possible in the resulting image. Numerous conventional "Zoom" techniques may be used to magnify portions of a main or orientation image while still displaying the full depth of the area of interest in the main image. However, prior art solutions implementing "zoom" techniques did not perform simultaneous and independent scan conversion of the main image and the magnified image.

For example, Roundhill et al., U.S. Pat. No. 5,471,989, disclose a system for processing zoom ultrasonic images. The user outlines a portion of a displayed image. The outlined portion of the image is then enlarged to occupy the larger area of the original image. Although Roundhill et al. disclose a varying filter bandwidth optimized to maximize information content of the displayed image, their system does not independently scan convert the main and magnified image windows for simultaneous display. Thus, there is a need in the art for an imaging system which can independently process a main and a magnified image simultaneously. The present invention provides a system which allows the display of both small and high magnification at the same time but in different regions of the image.

SUMMARY OF THE INVENTION

In one innovative aspect, the present invention provides a system and method for independently and simultaneously scan converting a main ultrasonic image and a magnified portion of the main image. A conventional transducer scans an area of interest and processes received ultrasound echo signals. A memory stores the plurality of received signals. These received signals correspond to the ultrasound echo from various locations throughout the area of interest. Pixel locations in a display device for both the main and the magnified window are mapped into the corresponding correlated location within the area of interest. Signals corresponding to echoes from positions adjacent to the correlated location are acquired from the memory, forming a set of acquired signals. Should the desired location correspond to an area within the main image, a display signal is interpolated from the acquired signals using a first subset of coefficients. If the desired location corresponds to an area within the magnified image, a display signal is interpolated from the acquired signals using a second subset of coefficients. The subsets may be varied according to the spatial relationship between the correlated location and the adjacent signal locations. In addition, depending on the image characteristics to be emphasized, the value of the first and second set of coefficients may be varied according to the context of the correlated location. Thus, the present invention allows independent and simultaneous scan conversion of both a main and a magnified portion of an ultrasound image. Both the main and the magnified portion may be displayed at the same time on either a conventional CRT display or another suitable display device.

DETAILED DESCRIPTION OF THE INVENTION

Figure 1:
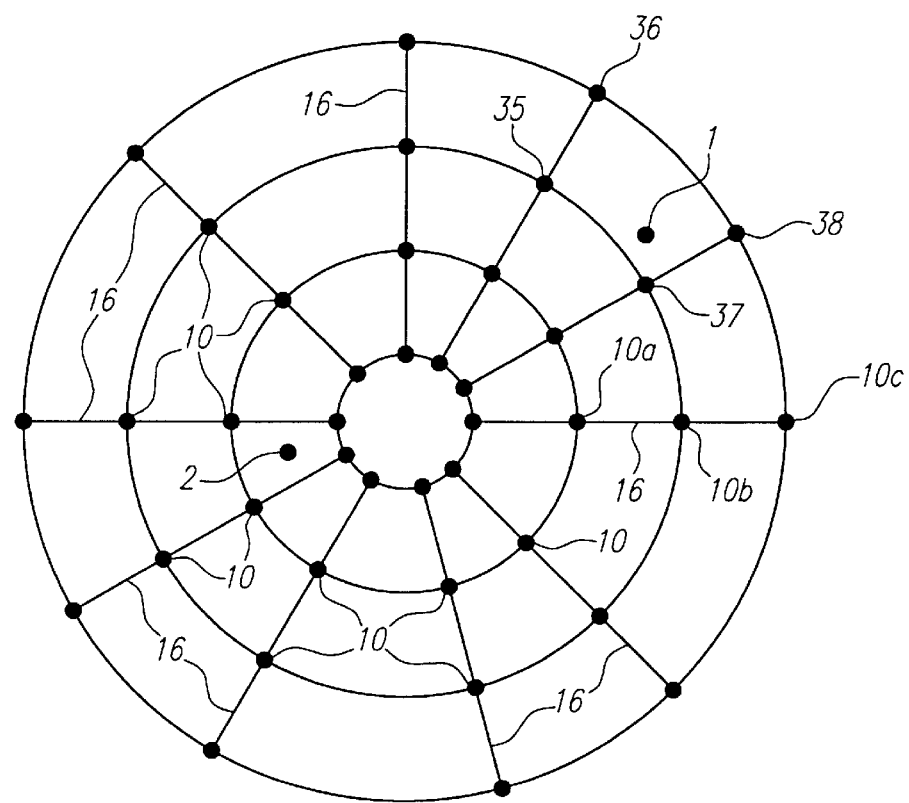
FIG. 1 illustrates a representation of R, θ locations corresponding to collected echo signals in an ultrasound scan.

Turning now to the figures, a representation of the various locations to which ultrasound echoes correspond in an intravascular ultrasound scan is illustrated in FIG. 1. Because a rotating transducer transmits the ultrasound pulses and receives the ultrasound echoes, each particular echo signal corresponds to a particular radial distance and angle (R and θ) with respect to the transducer. For example, consider echo signal locations 10a, 10b, and 10c. Each is positioned at the same angle θ whereas location 10a corresponds to a radius R1, location 10b corresponds to a larger radius R2, and location 10c corresponds to an even larger radius R3 and so on for other locations not illustrated. The echo signals corresponding to locations at the same angle but with varying radii are conventionally referred to as a vector 16. An intravascular ultrasound transducer may collect many such vectors 16 consisting of echoes from signal locations 10 at the same angle θ but at varying radii as illustrated.

Figure 2:
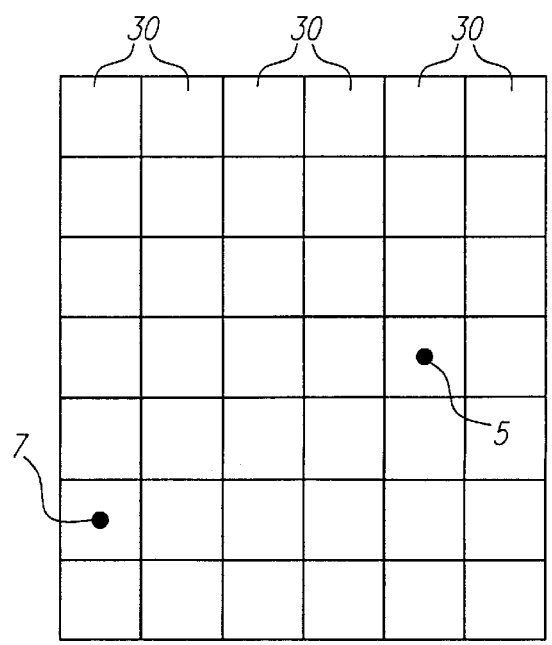
FIG. 2 illustrates the Cartesian arrangement of pixels in a typical CRT display.

A problem arises in displaying the data collected according to the locations 10 in FIG. 1 using a typical CRT display. As shown in FIG. 2, in such a display, pixels 30 are illuminated in a raster scan pattern. Thus, the pixels 30 are arranged in a Cartesian (or X, Y) pattern. Each pixel 30 must be mapped back to a correlated location within the scanned area of interest in order to form an image on the display. A given raster scan location 5 or location 7, when mapped into its correlated location within the area of interest, will not usually align with any echo signal location 10 as shown in FIG. 1. As shown, raster scan location 5 is mapped to correlated location 1 whereas raster scan location 7 is mapped to correlated location 2. Neither location corresponds with any of the locations 10 from which data has been collected. Therefore, the signal level in correlated location 1 or correlated location 2 is calculated by an interpolation of the nearest R, θ locations 10. For example, the signal level in correlated location 1 would be interpolated from signals corresponding to R, θ locations 35, 36, 37, and 38. The interpolation and mapping of the signals from the collected R, θ signal locations 10 to the Cartesian locations corresponding to pixels in the CRT display is known conventionally as scan conversion.

Figure 3:
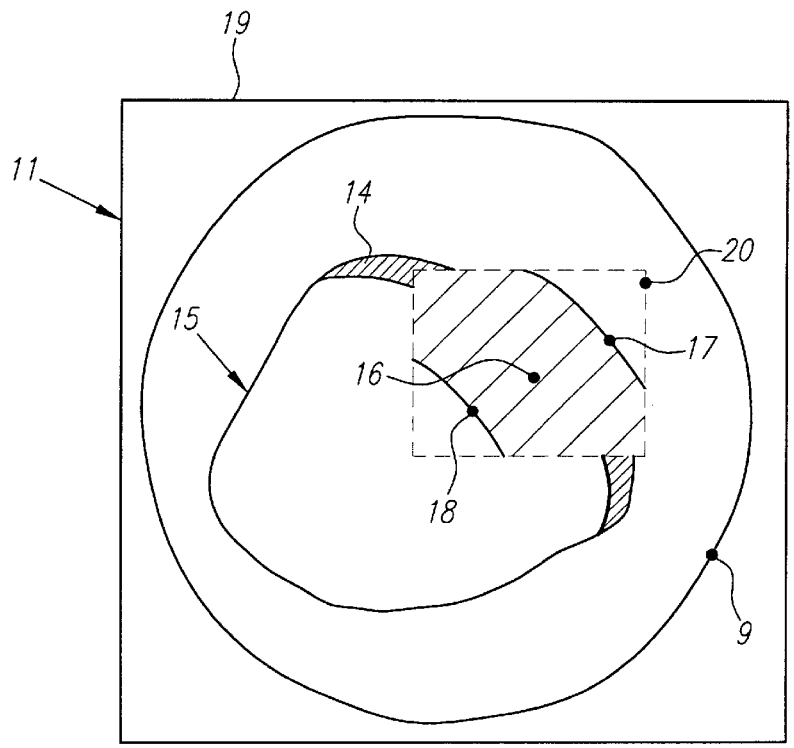
FIG. 3 illustrates an intravascular ultrasound image having a window illustrating a magnified portion according to one embodiment of the invention.

The present invention allows an independent and simultaneous scan conversion of both the main image and a magnified portion of the main image (conventionally known as a "zoom" image). A typical display generated by one embodiment of the present invention is illustrated in FIG. 3. An intravascular ultrasound image 9 is displayed on a display device 11 such as a CRT display. Within the image 9 is a blood vessel 15 with plaque 16. Orientation window 19, which may occupy the entire display 11, contains image 9. A magnification window 20 shows a magnified image of the plaque 16 within the outer vessel wall 17 and the inner vessel wall 18. The size, position, and magnification factor in magnification window 20 may be varied in real time. In addition, different interpolation factors may be used in the two windows as the context of the windows varies. The user may change these factors or the system may automatically vary the factors according to predetermined image requirements.

Figure 4:
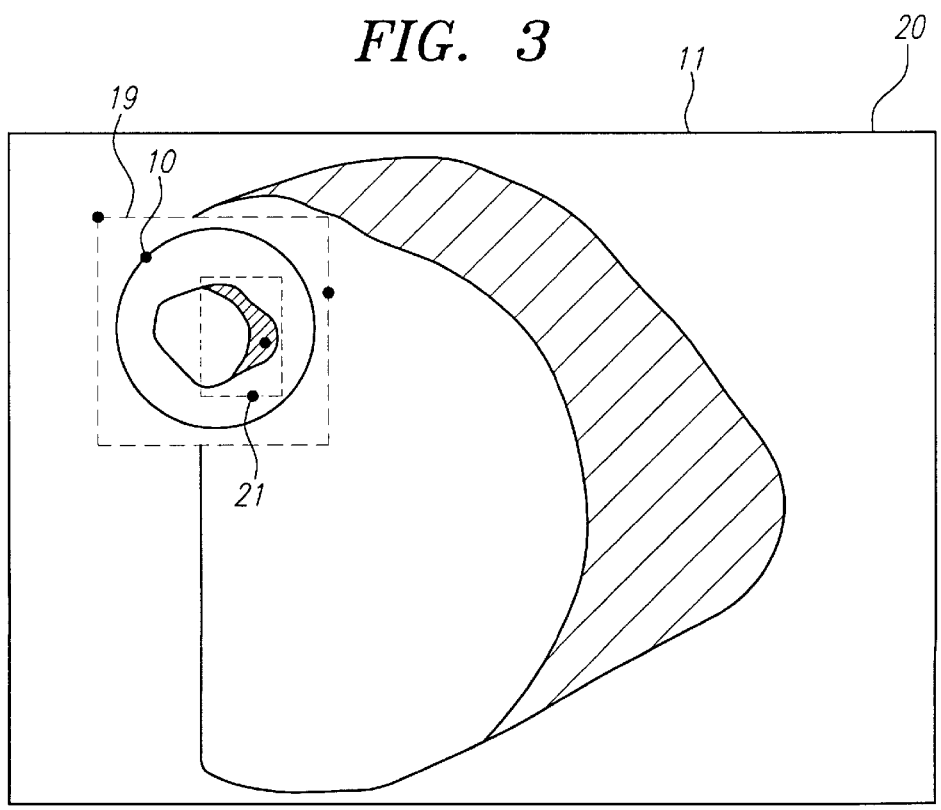
FIG. 4 illustrates an intravascular ultrasound image wherein the magnified portion occupies the display and the main image is compressed into a window on the magnified portion.

An alternative display generated by one embodiment of the present invention is illustrated in FIG. 4. In this embodiment the magnification window 20 occupies the display 11. Whereas the intravascular image 9 occupied the display in FIG. 3, it is placed in a smaller orientation window 19 in FIG. 4. A region of interest window 21 on image 9 within orientation window 19 demarcates the portion to be magnified. As with FIG. 3, the magnification factor, the size and location of the region of interest window 21 may be varied in real time. In addition, different interpolation factors may be used in the orientation window 19 illustrating the image 9 and in the magnification window 20.

Figure 5:
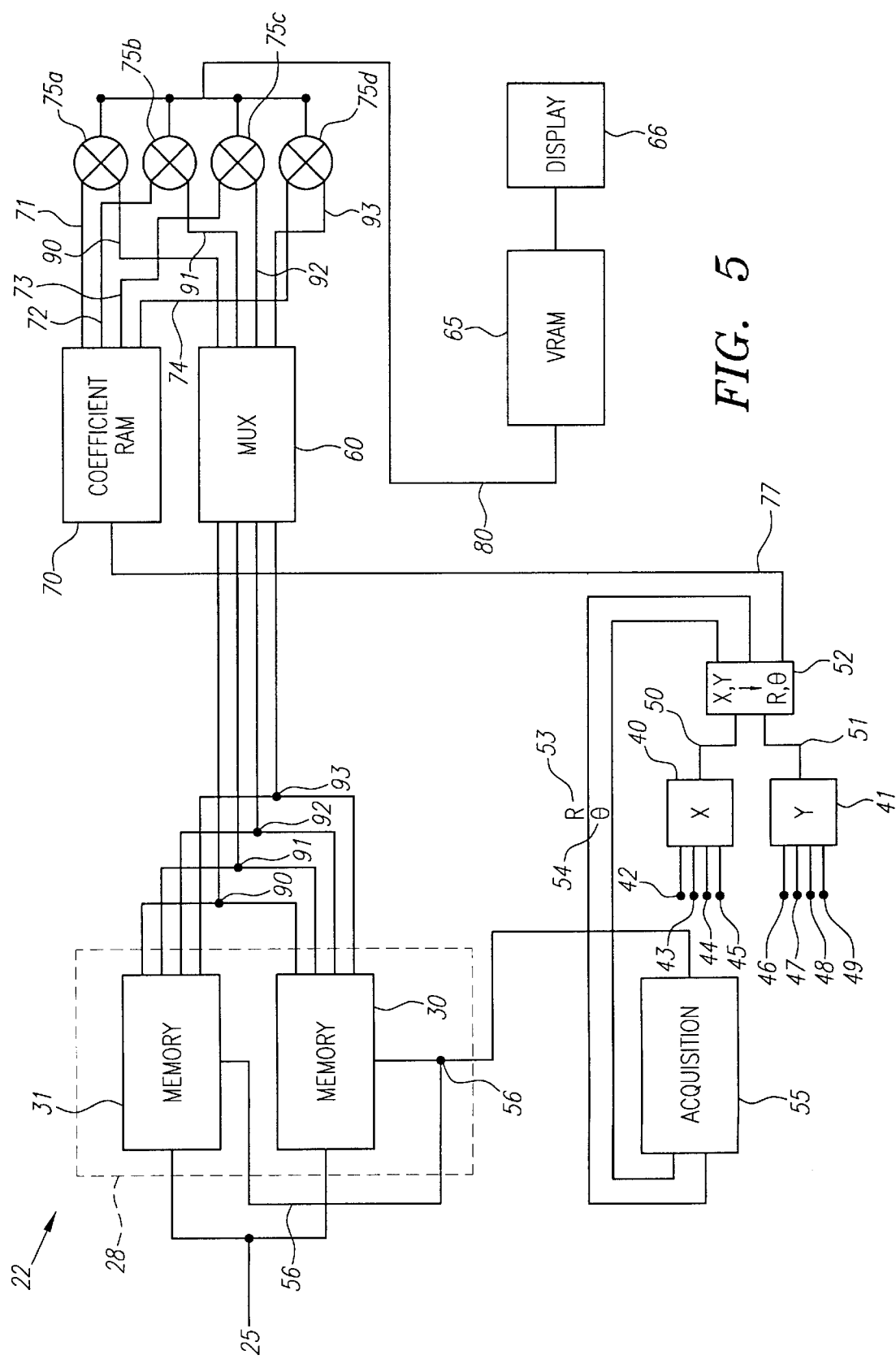
FIG. 5 is a block diagram of a scan conversion process according to one embodiment of the invention.

A system 22 for generating the multiple display windows having varying magnification factors according to one embodiment of the invention is illustrated in FIG. 5. A transducer (not illustrated) transmits pulses of ultrasound and receives the returned echo signals. A receiver (not illustrated) detects the returned echo signals and digitizes these signals. As the transducer completes an entire scan, a frame of echo signals 25 is collected and the digitized echo signals 25 are stored in a memory 28. Memory 28 preferably consists of dual RAM blocks 31 and 30. This allows more efficient operation because the blocks are alternatively written to and read from. For example, while system 22 reads a current frame of data from block 31, the frame still being formed would be written into block 30 and so on.

The data 25 residing in memory 28 must be scan converted before display. Blocks 40 and 41 represent the X and Y raster scan translation units. Those skilled in the art will appreciate that these blocks may be implemented in software or hardware. Their function may be understood through the following discussion. As illustrated in FIG. 2, a typical CRT display consists of pixels 30 arranged in Cartesian X and Y positions. The X, Y address of the pixels in the displayed image will correspond to an X, Y position in image 9 or in the magnification window 20. Indeed, image 9 is simply a representation of the signal strengths received at the R, θ locations 10 shown in FIG. 1. These locations may also be described in an X, Y Cartesian coordinate system. Translation units 40 and 41 translate the X, Y location of pixels on the CRT display to X, Y locations within the image 9 or the magnification window 20.

X raster scan translation unit 40 may have four inputs 42, 43, 44 and 45. Input 42 is the starting X address for the main or orientation window 19. Input 43 is the magnification factor in the X direction for orientation window 19. Input 44 supplies the starting address for the magnification window 20 with input 44 providing the corresponding magnification factor in the X direction for magnification window 20.

Similarly, Y raster scan translation unit 41 which generates the Y raster scan address location may have four inputs 46, 47, 48 and 49. Input 42 is the starting Y address for the main or orientation window 19. Input 47 is the magnification factor in the Y direction for orientation window 19. Input 48 supplies the starting Y address for the magnification window 20 with input 49 providing the corresponding magnification factor in the Y direction for magnification window 20.

Translation units 40 and 41 output an X location 50 and a Y location 51 signal, respectively. Because signals 25 are stored in a plurality of R, θ vectors in memory 28, these signals 50 and 51 must be translated into the corresponding cylindrical coordinates R location 53 and θ location 54 in coordinate transformation unit 52. Those skilled in the art will appreciate that such a unit may be implemented in either software or hardware. As discussed previously with respect to raster scan locations 5 or 7 in FIG. 1, R location 53 and θ location 54 will not ordinarily correspond to a the R, θ location 10 of a collected echo signal. Thus, interpolation of signals from memory 28 corresponding to R, θ locations adjacent to R location 53 and θ location 54 is normally required to calculate the signal strength at R location 53 and θ location 54.

Acquisition unit 55 acquires the signals corresponding to adjacent locations from the memory 28. As described previously, memory 28 stores the received signals in dual RAM blocks 30 and 31. After a dual RAM block has had a current frame of data written into it, memory 28 writes to the other dual RAM block. Acquisition unit 55 then acquires data from the dual RAM block which stores the current frame of data. In this way, acquisition unit 55 can acquire data from a current frame without the data being corrupted by new data being written over a current data value. Acquisition unit 55 selects signals corresponding to positions adjacent to the R location 53 and θ location 54 from the dual RAM block which stores the current frame of data. As illustrated in FIG. 1, in one embodiment of the current invention, four adjacent locations 35, 36, 37, and 38 may be selected to interpolate a value for location 5 corresponding to the R location 53 and θ location 54 as determined by X and Y raster scan translation units 40 and 41. Those of ordinary skill in the art will appreciate that a number greater or less than four adjacent signal locations could be selected by acquisition unit 55 without departing from the spirit of the invention. Those of ordinary skill will also appreciate that acquisition unit 55 may be implemented in either hardware, software, or a combination of both.

Acquisition unit 55 acquires signals 90, 91, 92, and 93 corresponding to locations 35, 36, 37, and 38, respectively. Adjacent signals 90, 91, 92, and 93 are input to MUX 60 which multiplexes signals 90 through 93 in that these signals will, in one embodiment of the invention, originate in one of dual RAM blocks 30 or 31 for a given frame of data and in the next frame of data originate in the other of dual RAM blocks 30 or 31. Signals 90 through 93 are each inputted to separate multipliers 75*a* through 75*d* respectively.

Multipliers 75*a* through 75*d* also receive coefficients 71 through 74 respectively, such that multiplier 75*a* receives coefficient 71, multiplier 75*b* receives coefficient 72, and so on. Multipliers 75*a* through 75*d* multiply signals 90 through 93 with coefficients 71 through 74 to produce output signals which are then summed to produce interpolated signal 80. Coefficients 71 through 74 are supplied by coefficient RAM 70 as selected by an appropriate combination of hardware and software. Coefficients 71 through 74 are varied as follows. Consider the example correlated locations 1 and 2 in FIG. 1. Location 2 is much closer to the transducer location (the intersection of vectors 16) than is location 1. Therefore, correlated location 2 is much closer to the locations 10 of the adjacent echo signals than is correlated location 1 to its locations 35, 36, 37 and 38 of the adjacent echo signals. Accordingly, the signals 90 through 93 should be interpolated differently to assign a value to correlated location 1 than the manner in which correlated location 7 would be interpolated from signals corresponding to adjacent locations 10. This difference is accounted for by spatial signal 77. Spatial signal may be generated by transformation unit 77. Spatial signal 77 relates to where the correlated location corresponding to the R location 53 and the θ location 54 is with respect to its adjacent signal locations 35, 36, 37 and 38. Coefficients 71 through 74 stored in coefficient RAM 70 are selected as a function of spatial signal 77.

In one embodiment of the invention, coefficients 71 and 74 are inversely proportional to the distance between the correlated location (mapped from the raster scan location corresponding to pixels in either image 9 or magnification window 20) and their corresponding adjacent signal locations 35, 36, 37, and 38. For example, consider correlated location 1 in FIG. 1. It is closest to adjacent signal location 37. Thus, the signal from location 37 (signal 92) should influence interpolated signal 80 corresponding to correlated location 1 more greatly than the other signals 90, 91 and 93 corresponding to locations 35, 36, and 38. Making the coefficients inversely proportional to the distance between its adjacent signal location and the correlated location would ensure that the signal 92 corresponding to location 37 would most greatly influence interpolated signal 80 because coefficient 73 (which is multiplied with signal 92) is greater in magnitude than the other coefficients 71, 72, and 73. Preferably, in this embodiment, the sum of coefficients 71 through 73 equals one.

Moreover, in addition to using a spatial dependence, coefficients 71 and 74 may also be varied as a function of whether the current display pixel (with its corresponding R location 53 and θ location 54) is within the main image 9 or within magnification window 20. For example, magnification window 20 may be concentrating on an area of plaque 16 which is calcified and thus requires a different form of interpolation than would a given pixel within the main image 9. This allows the imaging to be context-dependent. Spatial signal 77 would have to be adjusted accordingly to carry this information to coefficient RAM 70. The present invention also allows a user to adjust selection of coefficients in coefficient RAM 70 according to user preference using an input (not illustrated) into coefficient RAM 70. Thus, the user could adjust the interpolation within the main image 9 and the magnification window 20 independently of one another.

Regardless of the type of interpolation used, an interpolated signal 80 is formed by summing the outputs of multipliers 75*a* through 75*d*. Interpolated signal 80 may then be stored in VRAM 65 before being output at display 66. In this fashion, system 22 generates an interpolated signal 80 for each pixel in the display. Consider the advantages afforded by the present invention embodied in system 22. R, θ signals are scan converted and mapped simultaneously and independently into the main image 9 and magnification window 20. This happens in real time regardless of whether the display is in the embodiment illustrated in FIG. 3 or the embodiment illustrated in FIG. 4. Moreover, those of ordinary skill in the art will appreciate that the present invention, while discussed with respect to a main image 9 and a magnification window 20, is easily adapted to display multiple magnification windows 20 corresponding to different magnified portions of the main image 9.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An ultrasound imaging system for scanning an area of interest and displaying a main image of the area of interest and a magnified portion of the image, comprising:

a raster scan translation unit, said raster scan translation unit translating a pixel location on a display device to an X, Y location within the area of interest, said X, Y location being a function of whether said pixel location is within the main image or the magnified portion of the image;

a coordinate transformation unit, said coordinate transformation unit transforming said X,Y location to an R, θ location;

an acquisition unit, said acquisition unit selecting a plurality of signals from a given frame of ultrasound echo signals, the plurality of signals corresponding to locations adjacent to said R, θ location within the area of interest;

a multiplier, said multiplier multiplying each of said plurality of signals with a coefficient to produce a plurality of multiplied signals; and a summer; said summer adding said multiplied signals to produce an interpolated signal corresponding to said pixel location, wherein the coefficient is varied according to whether the pixel location is within the main image or the magnified portion of the image for the given frame of ultrasound echo signals.

2. The ultrasound imaging system of claim 1 further comprising:

a VRAM, said VRAM storing said interpolated signal; and a display device for displaying said interpolated signal in said pixel location.

3. The ultrasound imaging system of claim 2 further comprising:
a coefficient RAM, said coefficient RAM selecting the coefficients for multiplication with said plurality of signals adjacent to said R, θ location.

4. The ultrasound imaging system of claim 3 wherein said coefficient RAM selects from a plurality of sets of coefficients, said coefficient RAM selecting from a particular one of said sets depending of the spatial relationship of said R, θ location to the corresponding locations of said plurality of signals.

5. The ultrasound imaging system of claim 4 wherein said coefficient RAM further selects from a plurality of sets of coefficients depending on the context of the R, θ location.

6. The ultrasound imaging system of claim 3 wherein said acquisition unit selects at least four signals corresponding to locations adjacent to said R, θ location within the area of interest.

7. The ultrasound imaging system of claim 6 wherein said set of coefficients selected by said coefficient RAM has a sum, said sum substantially equaling one.

8. A method for displaying a main ultrasound image of an area of interest and a magnified portion of the main image, said method comprising:
collecting a frame of signals corresponding to echo locations within the area of interest;
generating a set of pixel locations corresponding to a raster scan;
correlating a given pixel location to a correlated location within the area of interest according to whether the pixel location is within the main image or the magnified portion of the main image;
acquiring a subset of signals from the set of signals corresponding to echo locations adjacent to the correlated location;
multiplying the subset of signals with a set of coefficients to generate a display signal level for the given pixel, wherein the set of coefficients is varied according to whether the given pixel is within the main image or the magnified portion of the main image;
repeating said correlating, acquiring and multiplying steps to generate display signal levels for all the pixels within the main image and the magnified portion of the image in real time.

9. The method of claim 8 wherein said set of coefficients in said multiplying step is selected according to a spatial relationship between the correlated location and the echo locations adjacent to the correlated location.

10. The method of claim 8 further comprising the step of storing said generated display signal levels in a VRAM.

11. The method of claim 8 wherein said subset of signals in said acquiring step and said multiplying step comprises at least four signals.

12. The method of claim 11 wherein said set of coefficients in said multiplying step has a sum, said sum substantially equaling one.

13. The method of claim 11 wherein said set of coefficients in said multiplying step is varied according to the context of the correlated location.

14. The method of claim 8 wherein said echo locations within the area of interest correspond to R, θ locations.

15. A method of displaying a main ultrasound image of an area of interest in a patient and a magnified portion of the main image, said method comprising:
collecting signals from a ultrasound transducer scanning the area of interest, said collecting step forming a frame of signals, said frame of signals corresponding to echo locations within the area of interest;
generating a raster scan for a display device, said raster scan corresponding to pixels in the display device;
assigning a signal level for each pixel corresponding to said raster scan by sequentially mapping the location of a given pixel into a correlated location within the area of interest, said mapping depending on whether the given pixel is within said main image or said magnified portion of the image, said signal level being formed by an interpolation of signals corresponding to echo locations adjacent to the correlated location, the interpolation being varied according to whether the given pixel is within the main image or the magnified portion of the image, whereby said main image and said magnified image are formed independently in real time from said frame of signals.

* * * * *